(12) United States Patent
Woll

(10) Patent No.: US 7,596,542 B1
(45) Date of Patent: Sep. 29, 2009

(54) SYSTEMS AND METHODS FOR CREATING GEOGRAPHIC CONNECTION MATRICES

(75) Inventor: Richard G. Woll, Livermore, CA (US)

(73) Assignee: Allstate Insurance Company, Northbrook, IL (US)

(*) Notice: Subject to any disclaimer, the term of this patent is extended or adjusted under 35 U.S.C. 154(b) by 387 days.

(21) Appl. No.: 11/057,163

(22) Filed: Feb. 15, 2005

Related U.S. Application Data

(60) Provisional application No. 60/573,928, filed on May 25, 2004, provisional application No. 60/573,925, filed on May 25, 2004.

(51) Int. Cl.
*G06F 7/00* (2006.01)
*G06F 17/30* (2006.01)

(52) U.S. Cl. .............. 707/1; 707/10; 707/100; 707/102; 707/104.1; 707/200; 701/200

(58) Field of Classification Search .......... 707/1, 707/10, 100–102, 104.1, 200; 701/200
See application file for complete search history.

(56) References Cited

U.S. PATENT DOCUMENTS 5,796,634 A * 8/1998 Craport et al. ............ 702/150

6,223,164 B1   4/2001 Seare et al.
2005/0262062 A1 * 11/2005 Xia ........................... 707/3

FOREIGN PATENT DOCUMENTS

EP         1092950 A1 *  4/2001

OTHER PUBLICATIONS

United Stated Postal Service, "National Zone Chart Pogroam, Technical Guide 2003-2004", May 2003, pp. 19-21.*
U.S. Appl. No. 11/057,162, entitled "Systems and Methods for Determining Territorial Rates," filed Feb. 15, 2005.

* cited by examiner

*Primary Examiner*—John E Breene
*Assistant Examiner*—Hares Jami
(74) *Attorney, Agent, or Firm*—Finnegan, Henderson, Farabow, Garrett & Dunner, L.L.P.

(57) ABSTRACT

ZIP code connection matrices are created for use in insurance ratemaking by identifying common borders of geographically defined regions. ZIP codes and associated cartographic boundaries are read from a database. Pairs of coordinates for the boundaries are stored in a matrix and values are calculated that represent each pair of coordinates in the matrix. The calculated values are stored in an encoded coordinates matrix and used to determine common segments. A connection matrix is formed representing connections among ZIP codes. A neighborhood matrix is then calculated, which stores values that represent an indication of closeness of each ZIP code in the neighborhood matrix to a target ZIP code.

27 Claims, 8 Drawing Sheets

200
ZIP 50001
50001
50001
50001
50001
50001
50001
50001
50001
50001
50001
50001
50001
50001
50001
50001
50001
50001
50001
50001

210
COORD

| | |
|---|---|
| 41334663 | -93428650 |
| 41334740 | -93442413 |
| 41320045 | -93442352 |
| 41318375 | -93461540 |
| 41289684 | -93462753 |
| 41283672 | -93475601 |
| 41284382 | -93500351 |
| 41297901 | -93500359 |
| 41300377 | -93504768 |
| 41314228 | -93504723 |
| 41320740 | -93504326 |
| 41319462 | -93485687 |
| 41310722 | -93485596 |
| 41327332 | -93475655 |
| 41330868 | -93481140 |
| 41334930 | -93478966 |
| 41335155 | -93486252 |
| 41347923 | -93479919 |
| 41349300 | -93481468 |
| 41349277 | -93476425 |

Fig. 2

| | |
|---|---|
| 3209267 | 958896 |
| 3195504 | 958973 |
| 3195565 | 944278 |
| 3176377 | 942608 |
| 3175164 | 913917 |
| 3162316 | 907905 |
| 3137566 | 908615 |
| 3137558 | 922134 |
| 3133149 | 924610 |
| 3133194 | 938461 |
| 3133591 | 944973 |
| 3152230 | 943695 |
| 3152321 | 934955 |
| 3162262 | 951565 |
| 3156777 | 955101 |
| 3158951 | 959163 |
| 3151665 | 959388 |
| 3157998 | 972156 |
| 3156449 | 973533 |
| 3161492 | 973510 |

Fig. 3

| |
|---|
| 10029159308450 |
| 9986149080221 |
| 9986339694308 |
| 9926376002982 |
| 9922585274085 |
| 9882434471497 |
| 9805089187707 |
| 9805064200730 |
| 9791285804848 |
| 9791426446489 |
| 9792667102615 |
| 9850915131955 |
| 9851199503857 |
| 9882265761809 |
| 9865124800275 |
| 9871918689125 |
| 9849149487618 |
| 9868940518032 |
| 9864099798371 |
| 9879859486014 |

Fig. 4

| | |
|---|---|
| 10029159308450 | 9986149080221 |
| 9986149080221 | 9986339694308 |
| 9986339694308 | 9926376002982 |
| 9926376002982 | 9922585274085 |
| 9922585274085 | 9882434471497 |
| 9882434471497 | 9805089187707 |
| 9805089187707 | 9805064200730 |
| 9805064200730 | 9791285804848 |
| 9791285804848 | 9791426446489 |
| 9791426446489 | 9792667102615 |
| 9792667102615 | 9850915131955 |
| 9850915131955 | 9851199503857 |
| 9851199503857 | 9882265761809 |
| 9882265761809 | 9865124800275 |
| 9865124800275 | 9871918689125 |
| 9871918689125 | 9849149487618 |
| 9849149487618 | 9868940518032 |
| 9868940518032 | 9864099798371 |
| 9864099798371 | 9879859486014 |
| 9879859486014 | 9879834502173 |

Fig. 5

SYSTEMS AND METHODS FOR CREATING GEOGRAPHIC CONNECTION MATRICES

RELATED APPLICATIONS

This application claims the benefit of priority from U.S. Provisional Application No. 60/573,928, entitled "Systems and Methods for Creating Geographic Connection Matrices," filed May 25, 2004, and U.S. Provisional Application No. 60/573,925, entitled "Systems and Methods for Determining Territorial Rates," filed May 25, 2004, the disclosure of each which are expressly incorporated herein by reference in their entirety.

The disclosure of the present invention is related to U.S. application Ser. No. 11/057,162, entitled "Systems and Methods for Determining Territorial Rates," filed Feb. 15, 2005, the disclosure of which is expressly incorporated herein by reference in its entirety.

TECHNICAL FIELD

The present invention relates to creating geographic connection matrices.

BACKGROUND

Generally, "insurance" is an agreement by which an insurer, sometimes referred to as an underwriter, undertakes to indemnify the insured party against loss, damage, or liability arising from certain risks, in exchange for consideration. The consideration paid by an insured party is typically referred to as a "premium," which is paid to keep the insurance in effect. An "insurance policy" is a contract of insurance that defines the rights and duties of the contracting parties. A typical insurance policy includes limits on the amount of risk that the insurer will cover.

For the purposes of the following discussion, an "insurance product" includes more than the insurance policy. It also includes services, distribution channels, and other components that may impact the customer experience.

Property insurance protects persons or businesses from financial loss caused by perils. Perils can include losses due to fire, water, earthquake, wind, explosions, aircraft damage (as when an aircraft crashes into a structure), lightning, hail, riot or civil commotion, smoke, vandalism, falling objects, theft, volcanic eruptions, and freezing. An insurance policy providing property insurance may cover some or all of these categories of perils. By paying a premium on a regular basis, a policyholder is insured against a loss caused by a peril within the scope of the policy.

Insurance rates are determined through an actuarial process. The process looks at data related to customer characteristics to determine differences in expected loss costs for different customers. One part of the actuarial process, referred to as "territorial ratemaking," is an actuarial process for adjusting rates in insurance or other risk transfer mechanisms based on location. The ratemaking process is prospective because property and casualty rates are typically developed prior to the transfer of risk from a customer to an insurance company. Accordingly, the rate in an insurance policy reflects an estimate of the expected value of future costs, so techniques estimate future losses and costs to determine insurance rates.

By analyzing loss-cost data of a region over a number of years, a company can estimate future exposure to risk more accurately by invoking mathematical methodologies. In the insurance industry, a common practice for determining rates involves estimating future costs by looking at past loss-cost data. Different actuarial methodologies further improve the credibility of the data available in the ratemaking process.

Data in many companies and government agencies is often organized according to ZIP code. Often, there is a need to identify geographical relationships of occurrences or experiences of a particular group with the experiences of another group. However, experiences may be less relevant if the other group is located a significant distance from the studied group's location.

The credibility of the data is a predictive value that an actuary attaches to a particular body of data. One way of increasing the credibility of the data is to increase the size of the group or to make groupings more homogeneous. Loss cost data is frequently broken down into commonly used, geographically defined regions such as postal ZIP codes. When data is sorted by ZIP code, some areas defined by ZIP codes may have little or no recent data from which to predict premiums accurately.

Pure premium data values can vary significantly among ZIP codes. The same data can also change significantly from year to year. In addition, losses from a given peril are statistically just as likely to occur across the street or on the next block, as where a particular loss occurred. The property located on the other side of the street may fall, however, within a different ZIP code where few if any such losses were experienced.

It is reasonable to assume that properties in neighboring areas are most likely to experience the same loss as the property that experienced the actual loss. However, an exposure to all perils may have a measurable difference in frequency or severity for properties that get further away from a given location.

One way to estimate bordering ZIP codes is to determine the shortest distance of the target ZIP code to the closest centroid of a neighboring ZIP code. However, using such a method creates a problem when an automated system cannot determine whether the shortest distance describes the only neighboring ZIP code or if there are others, and if so, how many there are. Given an irregular border, many ZIP codes could border the target ZIP code. In addition, because a centroid of a region may not be located in the center or even within a region, using such a methodology based on centroids might not be accurate. As a result, centroids alone may not be the best approach for determining neighboring ZIP codes.

Therefore, it is useful to relate the experience of neighboring properties and recognize that the relevance of the neighboring experience will diminish with distance.

SUMMARY

A method for identifying common borders of geographically defined regions consistent with this invention comprises reading ZIP codes and associated cartographic boundaries from a database; storing pairs of coordinates for the boundaries in a matrix; calculating values representing each pair of coordinates in the matrix; storing the calculated values in an encoded coordinates matrix; using the values in the encoded coordinates matrix to determine common segments; forming a connection matrix wherein each row represents a connection of a ZIP code with another ZIP code; and calculating a neighborhood matrix storing values that represent an indication of closeness of each ZIP code in the neighborhood matrix to a target ZIP code.

A system for identifying common borders of geographically defined regions consistent with this invention comprises a data processor; a module for causing the data processor to read ZIP codes and associated cartographic boundaries from a database; a module for causing the data processor to store pairs of coordinates for the boundaries in a matrix; a module for causing the data processor to calculate values representing each pair of coordinates in the matrix; a module for causing the data processor to store the calculated values in an encoded coordinates matrix; a module for causing the data processor to use the values in the encoded coordinates matrix to determine common segments; a module for causing the data processor to form a connection matrix wherein each row represents a connection of a ZIP code with another ZIP code; and a module for causing the data processor to calculate a neighborhood matrix storing values that represent an indication of closeness of each ZIP code in the neighborhood matrix to a target ZIP code.

BRIEF DESCRIPTION OF THE DRAWINGS

All descriptions are exemplary and explanatory only and do not restrict the invention, as claimed. The accompanying drawings, which are incorporated in and constitute a part of this specification, illustrate embodiments of the invention and, together with the description, serve to explain the principles of the invention. In the drawings:

FIG. 2 represents the first 20 rows of the matrices ZIP and COORD for the state of Iowa;

FIG. 3 is a exemplary matrix used in the process of FIG. 1;

FIG. 4 is an exemplary matrix that represents the result of encoding the first twenty coordinates of the Iowa polygon data;

FIG. 5 is an exemplary segment matrix;

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

The term "geocoding" refers to converting features found on a map into a computer-digital form. Through a geocoding process, spatial locations of map features are referenced geographically to a coordinate system stored by a computer system. Gecoding tools have various applications. For example, geocoding tools are used in marketing applications to define regions and create customer profiles. Geocoding tools also create maps that display relationships between regions that form a territory. A geocoding tool may use either a radius or a driving time to create a territory. For example, one may perform analysis of regions by forming territories based on distance from a target location identified by latitude and longitude. A radius of a specified distance extending from the target location may define a region.

Systems and methods consistent with the present invention provide a geocoding tool using a target region, for example, such as a ZIP code. Since a ZIP code typically describes a region and not a point, systems and methods consistent with the present invention identify geographically-based regions that neighbor a target region. Surrounding regions may form "rings" of neighbors that together combine to create a single neighboring territory.

This neighborhood process is useful in various industries, including the insurance industry. Embodiments consistent with the present invention may help an insurance company determine ZIP codes adjacent to areas with a high risk for natural perils such as hurricanes, floods, mudslides, other water-related perils, brush fires, and earthquakes without requiring physical inspection of an area. For example, an insurance company may determine future potential losses and fulfill state and local governmental compliance requirements that may exist in an area. Similarly, areas exhibiting growth and other strong market characteristics can be linked to adjacent ZIP codes to analyze other risks or common traits.

Figure 1:
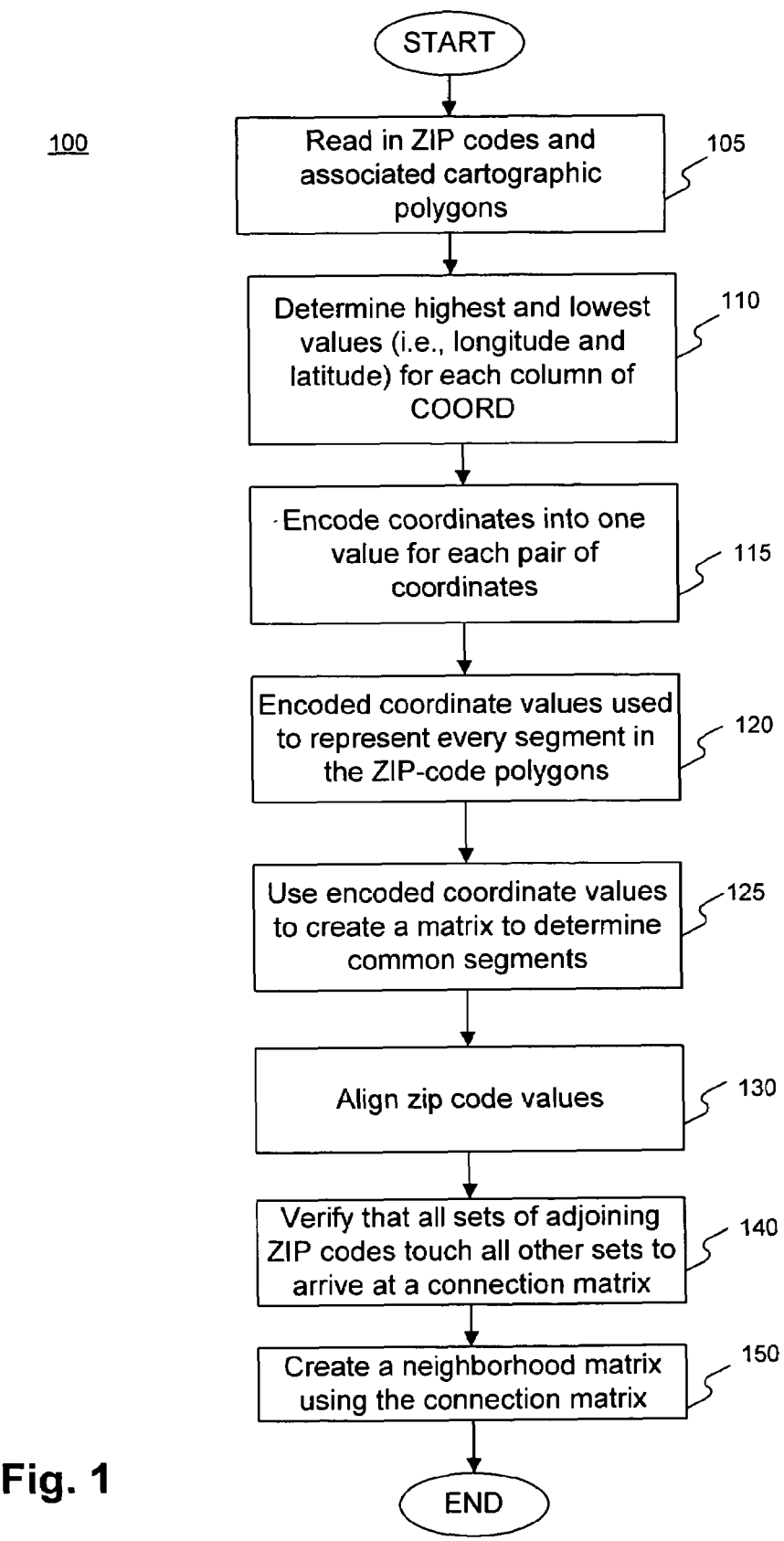
FIG. 1 is a flow diagram of a process for creating ZIP-code connection matrices.

FIG. 1 shows a process 100 for creating ZIP-code connection matrices. While the following example is described in terms of using ZIP codes to designate regions, the present invention is not limited to using ZIP codes. Any geographic region may be considered consistent with the present invention.

Process 100 begins by encoding Cartesian coordinates representing ZIP code polygons. First, a data processing system reads in ZIP codes and their associated cartographic polygons. (Step 105) A cartographic polygon can be represented as a single column matrix of ZIP codes and a two-column matrix of the associated polygon coordinates. In that two-column matrix, the first column is the set of latitudes and the second column is the set of longitudes.

For example, as FIG. 2 shows, the first matrix 200 is called ZIP and the second 210 is called COORD (representing the coordinate values). Next, the system determines the highest and lowest values (i.e., longitude and latitude) for each column of COORD. (Step 110) From this, the system calculates a value range for each column, representing the difference between each maximum and minimum.

To illustrate, refer to FIG. 2, which represents the first 20 rows of the matrices ZIP and COORD for the state of Iowa. There are as many values of 50001 as there are coordinates for that ZIP code. Both columns of COORD are shown with implicit decimal places. The implicit decimal point for the latitudes is between the second and third decimal place and the implicit decimal point for the longitudes is between the third and fourth columns. Thus, the first row of the matrix is really 41.334663 and −93.428650 respectively. The highest values in the matrix are 43500828 and −90158249 respectively, while the lowest are 40375767 and −96637917 respectively. The ranges for these coordinates are thus 3125062 for latitudes and 6479669 for longitudes.

The system next encodes these coordinates into one value for each pair of coordinates. (Step 115) This can be done by subtracting the respective minima from both pairs of coordinates, multiplying the result for latitudes by the range for latitudes, and adding the result for longitudes. Using FIG. 2, for example, the result of the subtraction yields the matrix shown in FIG. 3.

Multiplying each column in this matrix by the minimum latitude, 3125062, and adding the second column yields a one-column matrix, or Encoded Coordinates column vector (Step 120), as shown in FIG. 4. The matrix in FIG. 4 represents the result of encoding the first twenty coordinates of the Iowa polygon data. There would be one number for each coordinate pair, or 34,069 numbers in all for Iowa. The reason for subtracting the minima is to keep the numbers within the range permitted by double precision floating-point numbers. The maximum number in such a coordinate recoding scheme is 20249365864122 that is 14 digits. This is fewer than the 16 digits allowed for double-precision floating-point numbers.

After encoding the coordinates, the system uses the values in the matrix to determine common segments. (Step 125) One ZIP code is contiguous to another if it shares a common segment.

Figure 6A:
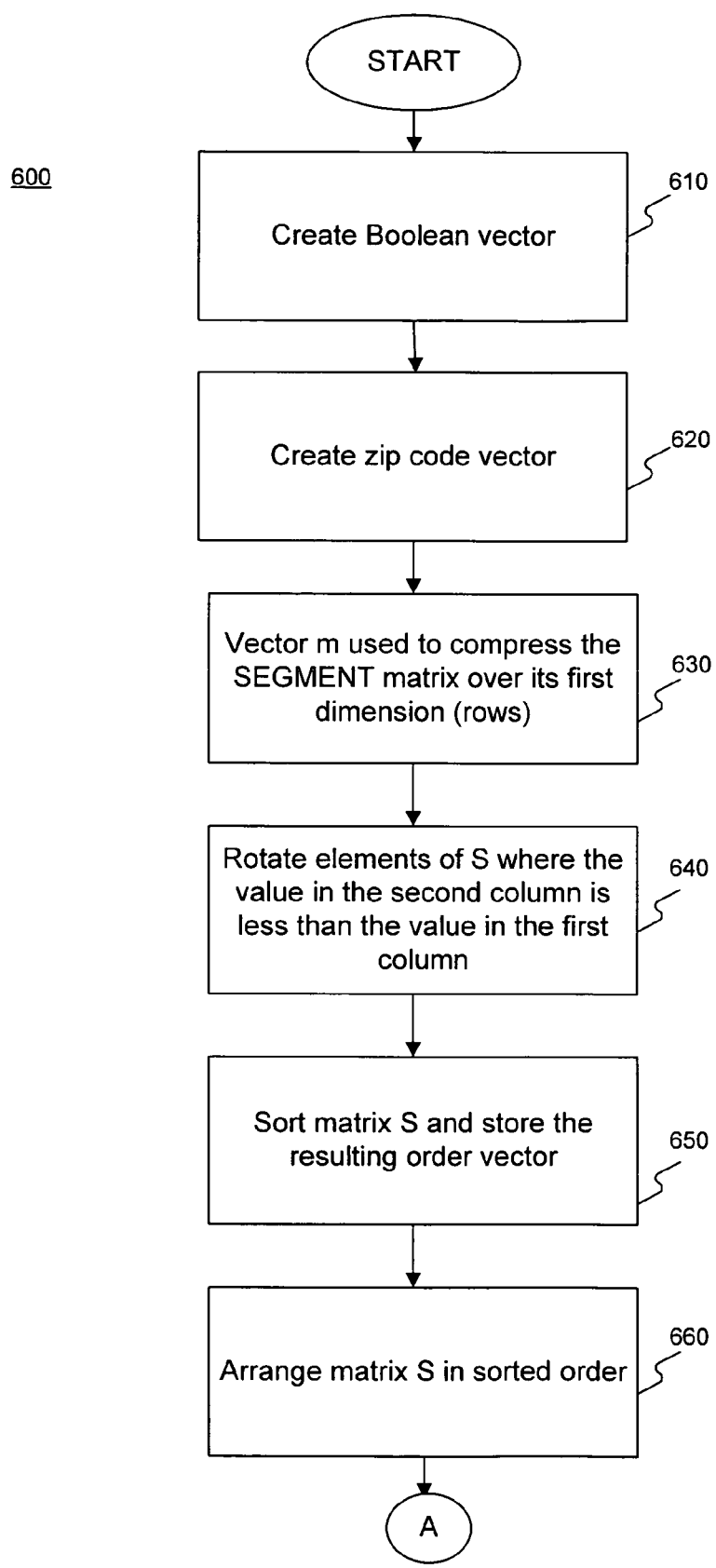
FIGS. 6A and 6B show a process for aligning the ZIP values with the SEGMENT values.
Figure 6B:
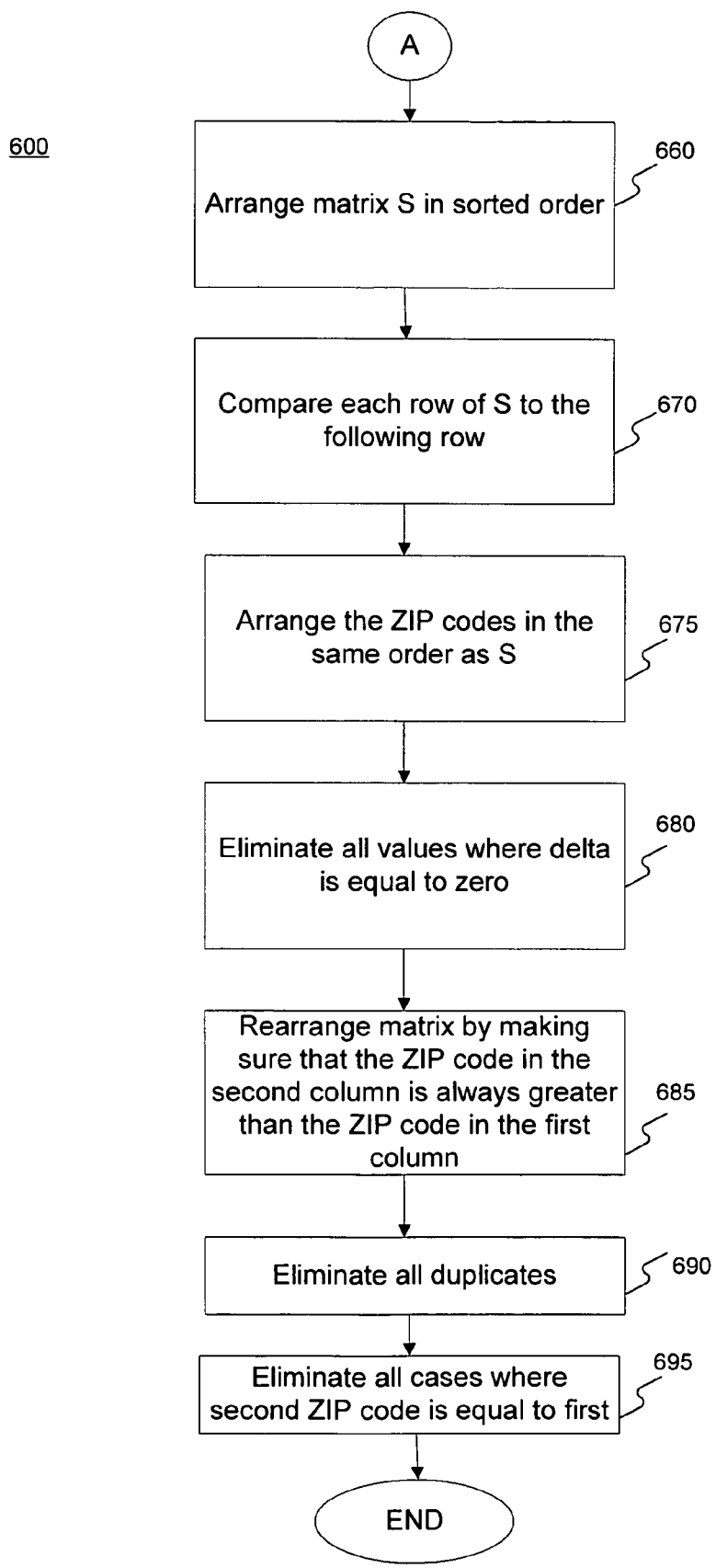

To align the ZIP code values (Step 130) with the SEGMENT values, the system uses the process 600 shown in FIG. 6. First, the system creates a Boolean vector (all zeros and ones) (Step 610) as follows:

m=[(−1↓ZIP)=(1↓ZIP)]

This vector is equal to one where successive values of ZIP (treated as a vector) are the same and is equal to zero where successive values of ZIP are different. Note that m has n−1 elements.

Next, the system creates a new ZIP code vector, ZIP (Step 620), as follows:

zip=m/(1↓ZIP)

where zip=m/x means zip is a vector with a length equal to the sum of m (the number of "ones" in m) and values corresponding to those values of the vector x where m is equal to one. In this manner, the system compresses the vector x to eliminate those positions where m is =zero.

The system uses vector m to compress the SEGMENT matrix over its first dimension (rows) (Step 630), as follows:

S=m/[1]SEGMENT

By doing so, the system eliminates those "segments" which span two different ZIP codes, leaving only segments within a single ZIP code. Thus, the length of ZIP and the number of rows in S are the same.

Next, the system rotates those elements of S where the value in the second column is less than the value in the first column. (Step 640) This insures that the value in the first column is always less than or equal to the value in the second column. Thus,

S=(>/S)ΦS which means rotate if the first value on a given row is greater than the value in the second row.

Next, the system sorts the matrix S and stores the resulting order vector in a vector called o. (Step 650)

o=(Sort)$_s$ stands for the sort order of S where (Sort) stands for sorting. The result is the sort order, however, not the actual data in sorted order.

The system next arranges the matrix S in sorted order. (Step 660)

S=S[o;]

This is equivalent to PL/I notation applying the vector o to the columns of the matrix S.

With S in sorted order, all equal segments should be next to each other. With this arrangement, the system compares each row of S to the following row (Step 670) as follows:

Δ=(1↓[1]S)=(−1↓[1]S) Δ=Δ[;1]=Δ[;2]

This yields a Boolean vector with ones wherever two segments are equal. The system next arranges the ZIP codes in the same order as S. (Step 675)

zip=zip[(Sort)s]

After comparing each member of the sorted ZIP codes (ZIP) to each other, the system eliminates all values where Δ is equal to zero. (Step 680)

CM=Δ/(−1↓zip), [1.5](1↓zip)

This yields a matrix with ZIP codes in both columns and where each ZIP code shares the same line segment. Such ZIP codes are contiguous.

The system next rearranges this matrix by making sure that the ZIP code in the second column is always greater than the ZIP code in the first column. (Step 685):

CM=(>/CM)ΦCM

The system then eliminates all duplicates. (Step 690).

CM=set(CM)

The function set is an APL program that eliminates duplicates after sorting. Finally, the system eliminates all cases where the second ZIP code is equal to the first. (Step 695)

CM=(CM[;1]≠CM[;2])/[1]CM

The expression in parentheses represents a Boolean vector where there is no match. This vector is then used to compress out the rows of the matrix CM where a zero implies that the values in both columns are the same.

Process 600 produces a list of all ZIP codes that touch each other as determined by having identical segments in the polygon data. All segments that touch each other are identical. That is, if there is a segment break in one ZIP code, there is a corresponding segment break in the adjoining ZIP code.

Figure 7:
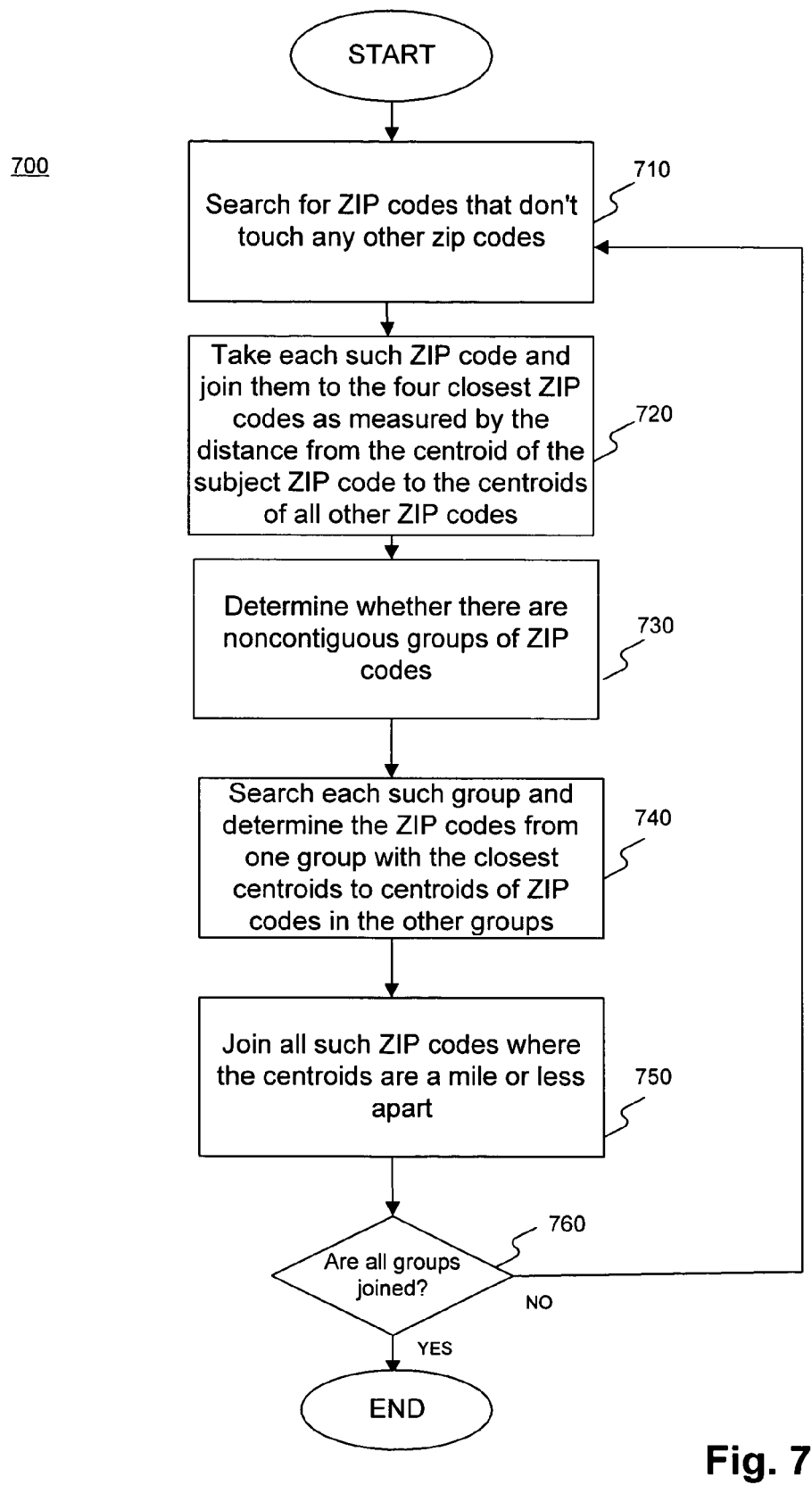
FIG. 7 is a procedure for ensuring that all sets of adjoining ZIP codes touch all other sets.

The system can also follow a procedure (as shown in FIG. 7) to make sure that all sets of adjoining ZIP codes touch all other sets. (Step 140) This is necessary, for instance, in New York where no ZIP codes in Brooklyn or Staten Island touch any ZIP codes for the rest of the state.

As shown in FIG. 7, the system first looks for ZIP codes that don't touch any others. (Step 710) These will be missing from the connection matrix produced in the first stage of analysis. The system next takes each such ZIP code and joins it to the four closest ZIP codes as measured by the distance from the centroid of the subject ZIP code to the centroids of all other ZIP codes. (Step 720)

After joining every ZIP code to the connection matrix, the system determines whether there are noncontiguous groups of ZIP codes (i.e., groups of ZIP codes that do not touch other groups). (Step 730) This can be accomplished by an algorithm that starts with one ZIP code and follows through every ZIP code that touches it until all touching ZIP codes have been exhausted. If any are left, the system starts with one of the remaining ZIP codes and repeats the procedure. This continues until every ZIP code has been accounted for.

In New York, there are five groups that do not touch: Manhattan, Staten Island, the remainder of the state, two on Long Island that do not touch the rest of the state, and two forming a barrier island south of Long Island that do not touch the rest of the island.

The system goes through each such group and determines the ZIP codes from one group with the closest centroids to the centroids of ZIP codes in the other groups. (Step 740) The system then joins all such ZIP codes where the centroids are a mile or less apart, and if there are fewer than four, it joins the four closest ZIP codes even if the distances between their centroids are more than a mile. (Step 750)

After completing this process, the system checks whether all groups are joined (Step 760) and repeats the process if not. The final result is a two-column connection matrix where each row indicates a connection of one ZIP code with another. Most such connections are determined because they share common boundary segments. Situations exist where territories do not touch, such as, for example, regions having water boundaries. In these situations, connections are based on centroid closeness.

Returning to FIG. 1, a two-column connection matrix has been created, in which each row of the matrix lists regions, such as ZIP codes, that are touching. (Step 140) After determining the connection matrix (step 150), the system creates a neighborhood matrix, preferably by using the data in the connection matrix to determine for each ZIP code the ZIP codes that it borders.

The neighborhood matrix is defined to include one row and one column for each ZIP code or region under consideration. For example, in a state with 1,500 ZIP codes, the neighborhood matrix will have 1,500 rows and 1,500 columns. Within the neighborhood matrix, numbers represent a relationship between each ZIP code and the other represented ZIP codes.

To create the neighborhood matrix, the system starts at the first row and places a "1" in the first column since the column and row ZIP code are the same. This occurs because the intersection of the first row and the first column represent the same ZIP code. As a result, "1" will represent all elements of the diagonal of the matrix.

The neighborhood matrix then uses the connection matrix to determine the ZIP codes that border or touch the ZIP code of the first row. A "2" is placed in each column in the first row underneath the ZIP codes that touch the ZIP code being mapped into the neighborhood matrix. This information defines the set of immediate neighbors for the first ZIP code. The system proceeds to examine the ZIP codes represented by all of the rows in the neighborhood matrix and locates all of the ZIP codes that touch the first ZIP code under consideration. At this point, the neighborhood matrix stores diagonally values of "1" representing rows and columns that represent the same ZIP code and the values of "2" representing ZIP codes touching the ZIP code under consideration. A value of "0" may be used to fill in the remaining elements of the matrix as a placeholder.

Next, the system proceeds to examine all remaining ZIP codes using the connection matrix to determine which ZIP codes touch the ZIP codes designated with the value of "2." In the next iteration, each ZIP code designated by a "2" is examined to determine which ZIP codes border or touch it, and a value of "3" is assigned to the matrix. The process repeats for each row successively and continues until desired or until all ZIP codes are accounted for.

At the conclusion of the process, one may determine whether a territory, such as a ZIP code, borders another territory, based on the connection matrix. In addition, the neighborhood matrix provides a regional view for a particular location by providing an analysis of the neighboring regions that touch a selected territory or ZIP code. The above methodology is applicable in the insurance industry, for example, where one is interested in determining geographical relationships when determining insurance rates.

For example, in the insurance industry, embodiments consistent with the present invention normalize the loss cost data of territories surrounding a target ZIP code. The loss cost data can identify historic loss costs based on perils that have occurred in a target ZIP code. Embodiments with application to the insurance industry therefore determine ZIP codes adjacent to or near areas that have a high risk for natural perils such as hurricanes, floods, mudslides, brushfires, earthquakes, and other perils. One may determine a high risk based on an incident of risks causing a monetary damage exceeding a certain threshold over a period of time, for example.

Embodiments consistent with the present invention have wide ranging applications, such as creating maps that present neighboring relationships by highlighting borders, color coding regions, shading regions, or displaying other graphical indicators. Embodiments consistent with the present invention also identify neighboring ZIP codes that form a territory. The territory represents all neighboring ZIP codes of a target location or region. A database storing ZIP code data collected from all ZIP codes that comprise the territory may be normalized or mathematically manipulated to produce economically useful output.

In other industries, embodiments consistent with the present invention may identify neighboring ZIP codes that border stores that are located in a specific ZIP code instead of using an arbitrary radius of distance (such as miles or kilometers) or driving time. Embodiments may identify the ZIP codes that form the closest ring of neighbors, followed by the next closest, and so on. The data produced from such an analysis may determine sales coverage, sales territories, market penetration, or other quantifiable data relationships.

System Configuration

Figure 8:
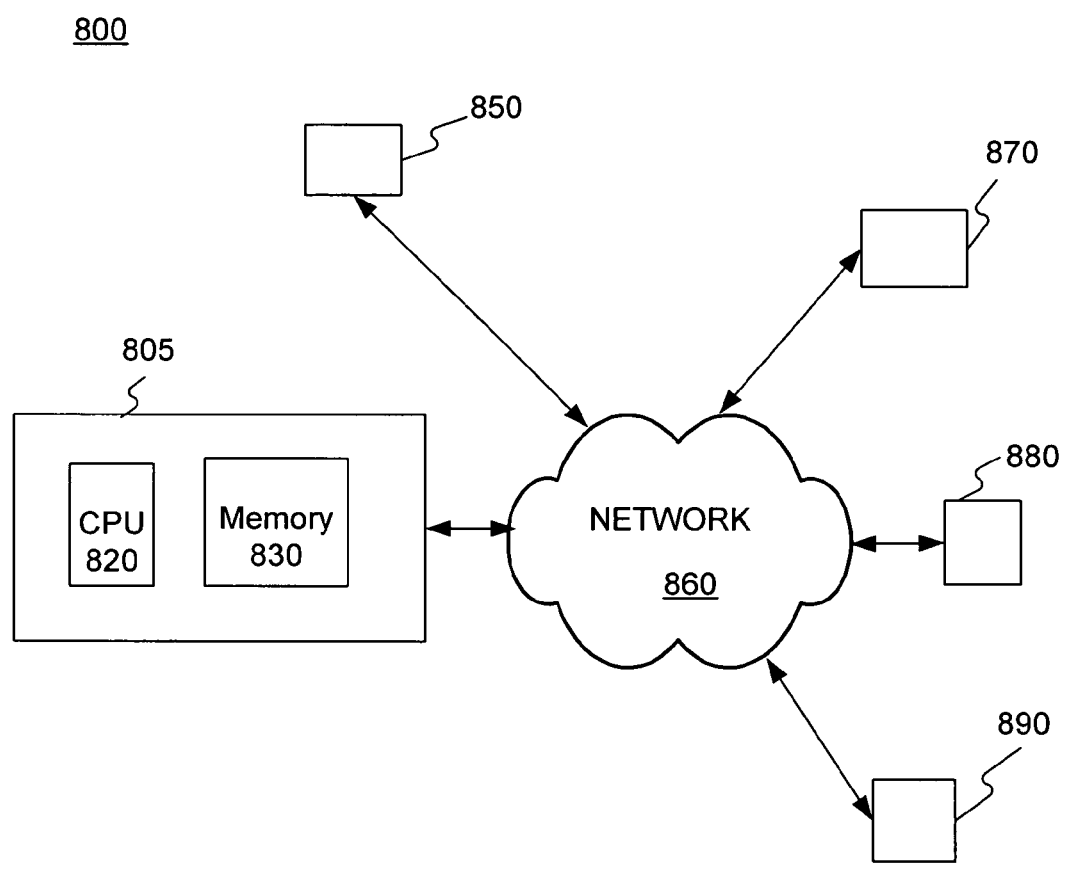
FIG. 8 illustrates a diagram of a system consistent with the present invention.

FIG. 8 illustrates a system 800 consistent with the present invention. System 800 includes a server 805, connected to a network 860, including a CPU 820 and a memory 830. Software loaded into memory 830 from, for example, a disk drive (not shown) at the direction of CPU 820 may be used to implement a program for determining insurance premiums for property. Various program modules may be stored in memory 830 as software for implementing the functionality of the present invention.

Network 860 provides communications between the various entities in system 800, such as user terminals 870-890. Network 860 may be a shared, public, or private network and encompass a wide area or local area. Further, network 860 may be implemented through any suitable combination of wired and/or wireless communication networks. By way of example, network 860 may be implemented through a wide area network (WAN), local area network (LAN), an intranet, or the Internet.

Terminals 870-890 allow a user to exchange information with server 805. Terminals 870-890 may be any type of appropriate device for communicating with server 805 over network 860. For example, terminal 870 may be a PDA running a program for communicating with server 805, while terminal 880 may be a desktop computer running a web browser for communicating with server 805 via the Internet. Terminal 890 may be a standard landline telephone or wireless phone.

Users may access server 805 via network 860 to determine insurance premiums for property through a web browser running on, for example, terminal 880. A website may include options for specifying a customer's location, and may present the user with a series of screens prompting the user to make various selections.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software, but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A computer-implemented method for identifying common borders of geographically defined regions, the method comprising:

reading ZIP codes of the geographically defined regions and associated cartographic boundaries of the geographically defined regions from a database, the cartographic boundaries including pairs of coordinates;
storing the pairs of coordinates for the boundaries in a matrix;
calculating values representing each pair of coordinates in the matrix;
storing the calculated values in an encoded coordinates matrix;
using the values in the encoded coordinates matrix to determine common segments of the common borders of the geographically defined regions;
forming, using a processor, a connection matrix storing the ZIP codes of the geographically defined regions, wherein connected ZIP codes of the geographically defined regions are stored in a same row, the connected ZIP codes being geographically contiguous and sharing the determined common segments of the common borders of the geographically defined regions;
calculating a neighborhood matrix storing the ZIP codes of the geographically defined regions and storing values that represent an indication of closeness of each ZIP code in the neighborhood matrix to a target ZIP code in the neighborhood matrix; and
storing the neighborhood matrix in a storage.

2. The method of claim 1, wherein the cartographic boundaries include a two-column matrix of coordinates corresponding to different ZIP codes.

3. The method of claim 1, wherein storing pairs of coordinates for the boundaries in the matrix comprises forming a first column representing a set of latitudes and forming a second column representing a set of longitudes.

4. The method of claim 1, further comprising:
determining a first ZIP code and a second ZIP code are contiguous if the first ZIP code and the second ZIP code share a common segment; and
determining the first ZIP code and the second ZIP code are not contiguous if the first ZIP code and the second ZIP code do not share a common segment.

5. The method of claim 1, wherein connections are determined because the ZIP codes in the matrix share common boundary segments.

6. The method of claim 1, wherein connections are determined based on centroid closeness of the ZIP codes in the matrix.

7. The method of claim 1, wherein the neighborhood matrix includes one row and one column for each ZIP code or region under consideration.

8. A system for identifying common borders of geographically defined regions, the system comprising:
a data processor;
a module for causing the data processor to read ZIP codes of the geographically defined regions and associated cartographic boundaries of the geographically defined regions from a database, the cartographic boundaries including pairs of coordinates;
a module for causing the data processor to store the pairs of coordinates for the boundaries in a matrix;
a module for causing the data processor to calculate values representing each pair of coordinates in the matrix;
a module for causing the data processor to store the calculated values in an encoded coordinates matrix;
a module for causing the data processor to use the values in the encoded coordinates matrix to determine common segments of the common borders of the geographically defined regions;
a module for causing the data processor to form a connection matrix storing the ZIP codes of the geographically defined regions, wherein connected ZIP codes of the geographically defined regions are stored in a same row, the connected ZIP codes being geographically contiguous and sharing the determined common segments of the common borders of the geographically defined regions;
a module for causing the data processor to calculate a neighborhood matrix storing the ZIP codes of the geographically defined regions and storing values that represent an indication of closeness of each ZIP code in the neighborhood matrix to a target ZIP code in the neighborhood matrix; and
a storage for storing the neighborhood matrix.

9. The system of claim 8, wherein the cartographic boundaries include a two-column matrix of coordinates corresponding to different ZIP codes.

10. The system of claim 8, wherein storing pairs of coordinates for the boundaries in the matrix comprises forming a first column representing a set of latitudes and forming a second column representing a set of longitudes.

11. The system of claim 8, further comprising:
a module for determining a first ZIP code and a second ZIP code are contiguous if the first ZIP code and the second ZIP code share a common segment; and
a module for determining the first ZIP code and the second ZIP code are not contiguous if the first ZIP code and the second ZIP code do not share a common segment.

12. The system of claim 8, wherein connections are determined because the ZIP codes in the matrix share common boundary segments.

13. The system of claim 8, wherein connections are determined based on centroid closeness of the ZIP codes in the matrix.

14. The system of claim 8, wherein the neighborhood matrix includes one row and one column for each ZIP code or region under consideration.

15. A computer-implemented method for identifying common borders of geographic regions, the method comprising:
reading identifiers of the geographic regions and associated cartographic polygons of the geographic regions from a database, the cartographic polygons including pairs of coordinates;
forming a two-column matrix representing the pairs of coordinates defining the cartographic polygons;
calculating values representing each pair of coordinates in the two-column matrix;
storing the values in an encoded coordinates matrix;
using the values in the encoded coordinates matrix to determine common segments of the common borders of the geographic regions;
calculating, using a processor, a connection matrix storing the identifiers of the geographic regions, wherein connected identifiers of the geographic regions are stored in a same row, the connected identifiers being geographically contiguous and sharing the determined common segments of the common borders of the geographic regions;
calculating a neighborhood matrix storing the identifiers of the geographic regions and storing values that represent an indication of closeness of each identifier in the neighborhood matrix to a target identifier in the neighborhood matrix; and
storing the neighborhood matrix in a storage.

16. A system for identifying common borders of geographic regions, the system comprising:
a data processor;
a module for causing the data processor to read identifiers of the geographic regions and associated cartographic polygons of the geographic regions from a database, the cartographic polygons including pairs of coordinates;

a module for causing the data processor to form a two-column matrix representing the pairs of coordinates defining the cartographic polygons;

a module for causing the data processor to calculate values representing each pair of coordinates in the two-column matrix;

a module for causing the data processor to store the values in an encoded coordinates matrix;

a module for causing the data processor to use the values in the encoded coordinates matrix to determine common segments of the common borders of the geographic regions;

a module for causing the data processor to calculate a connection matrix storing the identifiers of the geographic regions, wherein connected identifiers of the geographic regions are stored in a same row, the connected regions being geographically contiguous and sharing the determined common segments of the common borders of the geographic regions;

a module for causing the data processor to calculate a neighborhood matrix storing the identifiers of the geographic regions and storing values that represent an indication of closeness of each identifier in the neighborhood matrix to a target identifier in the neighborhood matrix; and a storage for storing the neighborhood matrix.

17. A computer readable storage device storing instructions which, when executed by a processor, perform a method of identifying common borders of geographic regions, the method comprising:

reading identifiers of the geographic regions and associated cartographic polygons of the geographic regions from a database, the cartographic polygons including pairs of coordinates;

forming a two-column matrix representing the pairs of coordinates defining the cartographic polygons;

calculating values representing each pair of coordinates in the two-column matrix;

storing the values in an encoded coordinates matrix;

using the values in the encoded coordinates matrix to determine common segments of the common borders of the geographic regions;

calculating a connection matrix storing the identifiers of the geographic regions, wherein connected identifiers of the geographic regions are stored in a same row, the connected regions being geographically contiguous and sharing the determined common segments of the common borders of the geographic regions;

calculating a neighborhood matrix storing the identifiers of the geographic regions and storing values that represent an indication of closeness of each identifier in the neighborhood matrix to a target identifier in the neighborhood matrix; and storing the neighborhood matrix in a storage.

18. The method of claim 1, wherein:
the connection matrix has two columns of ZIP codes.

19. The method of claim 1, wherein:
a first row and a first column of the neighborhood matrix store ZIP codes; and
remaining cells in the neighborhood matrix store the values that represent the indication of closeness of the ZIP code in the corresponding first row and the ZIP code in the corresponding first column.

20. The system of claim 8, wherein:
the connection matrix has two columns of ZIP codes.

21. The system of claim 8, wherein:
a first row and a first column of the neighborhood matrix store ZIP codes; and
remaining cells in the neighborhood matrix store the values that represent the indication of closeness of the ZIP code in the corresponding first row and the ZIP code in the corresponding first column.

22. The method of claim 15, wherein:
the connection matrix has two columns of regions.

23. The method of claim 15, wherein:
a first row and a first column of the neighborhood matrix store regions; and
remaining cells in the neighborhood matrix store the values that represent the indication of closeness of the region in the corresponding first row and the region in the corresponding first column.

24. The system of claim 16, wherein:
the connection matrix has two columns of regions.

25. The system of claim 16, wherein:
a first row and a first column of the neighborhood matrix store regions; and
remaining cells in the neighborhood matrix store the values that represent the indication of closeness of the region in the corresponding first row and the region in the corresponding first column.

26. The computer readable storage device of claim 17, wherein:
the connection matrix has two columns of regions.

27. The computer readable storage device of claim 17, wherein:
a first row and a first column of the neighborhood matrix store regions; and
remaining cells in the neighborhood matrix store the values that represent the indication of closeness of the region in the corresponding first row and the region in the corresponding first column.

* * * * *

UNITED STATES PATENT AND TRADEMARK OFFICE
CERTIFICATE OF CORRECTION

PATENT NO.         : 7,596,542 B1                                              Page 1 of 1
APPLICATION NO.    : 11/057163
DATED              : September 29, 2009
INVENTOR(S)        : Woll It is certified that error appears in the above-identified patent and that said Letters Patent is hereby corrected as shown below:

On the Title page,

[*] Notice:    Subject to any disclaimer, the term of this patent is extended or adjusted under
               35 U.S.C. 154(b) by 387 days.

Delete the phrase "by 387" and insert -- by 666 --

Signed and Sealed this

Fourth Day of May, 2010

David J. Kappos
*Director of the United States Patent and Trademark Office*